US011422841B2

(12) United States Patent
Jeong

(10) Patent No.: US 11,422,841 B2
(45) Date of Patent: Aug. 23, 2022

(54) DIRECT AND REMOTE CONTROL APPARATUS OF PHYSICAL DEVICE

(71) Applicant: BLUECOMMUNICATION, Seoul (KR)

(72) Inventor: Hee Yong Jeong, Seongnam-si (KR)

(73) Assignee: BLUECOMMUNICATION, Seoul (KR)

( * ) Notice: Subject to any disclaimer, the term of this patent is extended or adjusted under 35 U.S.C. 154(b) by 27 days.

(21) Appl. No.: 16/387,184

(22) Filed: Apr. 17, 2019

(65) Prior Publication Data
US 2019/0317793 A1    Oct. 17, 2019

(30) Foreign Application Priority Data
Apr. 17, 2018   (KR) .................... 10-2018-0044403

(51) Int. Cl.
*G06F 9/455* (2018.01)
*G09B 19/00* (2006.01)
(Continued)

(52) U.S. Cl.
CPC ........... *G06F 9/45558* (2013.01); *G09B 5/14* (2013.01); *G09B 19/0053* (2013.01);
(Continued)

(58) Field of Classification Search
CPC ....... G06F 2009/45595; G06F 9/45558; G06F 2009/45575; G06F 2009/45591;
(Continued)

(56) References Cited

U.S. PATENT DOCUMENTS 9,324,189 B2 *   4/2016   Vaughn .................. B64D 47/08
10,600,335 B1 *   3/2020   Donovan ........... G09B 19/0053
(Continued)

FOREIGN PATENT DOCUMENTS

JP    2007-225726 A    9/2007
KR    10-1143137 B1    5/2012
(Continued)

OTHER PUBLICATIONS

Brown University, "Software enables robots to be controlled in virtual reality", 2017. Retrieved online on Oct. 14, 2020. (Year: 2017).*
(Continued)

*Primary Examiner* — Dhairya A Patel
*Assistant Examiner* — Sandarva Khanal
(74) *Attorney, Agent, or Firm* — Paratus Law Group, PLLC

(57) ABSTRACT

There is provided an apparatus including a virtual machine unit for remote training, configured to implement a virtual remote training environment regarding physical software coding training between a student terminal and a teacher terminal, a virtual machine unit for remote control, configured to implement a virtual remote control environment regarding physical operation control over a physical device connected to the student terminal and to perform direct remote control of the teacher terminal, and a hypervisor unit for physical device control, configured to intercept the direct remote control of the teacher terminal over the physical device in the virtual remote training environment and to provide the teacher terminal with a right to control the physical device.

5 Claims, 6 Drawing Sheets

(51) Int. Cl.
  *H04L 67/125* (2022.01)
  *G09B 5/14* (2006.01)
(52) U.S. Cl.
  CPC .. *H04L 67/125* (2013.01); *G06F 2009/45575* (2013.01); *G06F 2009/45591* (2013.01); *G06F 2009/45595* (2013.01)
(58) Field of Classification Search
  CPC .. G06F 9/452; G06F 2009/45579; G06F 8/30; G06F 9/453; G06F 9/45533; G06F 9/45; G06F 9/455; G09B 19/0053; G09B 5/14; H04L 67/125; G06Q 50/20
  See application file for complete search history.

(56) References Cited

U.S. PATENT DOCUMENTS

| | | | | |
|---|---|---|---|---|
| 10,798,184 | B2* | 10/2020 | Henning | H04L 67/125 |
| 2002/0103882 | A1* | 8/2002 | Johnston | H04L 67/36 |
| | | | | 709/218 |
| 2003/0065472 | A1* | 4/2003 | Eckel | H05B 47/11 |
| | | | | 702/130 |
| 2003/0182358 | A1* | 9/2003 | Rowley | G09B 5/12 |
| | | | | 709/203 |
| 2004/0191744 | A1* | 9/2004 | Guirguis | G09B 7/00 |
| | | | | 434/322 |
| 2008/0204919 | A1* | 8/2008 | Masuyama | G11B 19/02 |
| | | | | 360/69 |
| 2009/0049436 | A1* | 2/2009 | Kaga | G06F 11/3612 |
| | | | | 717/154 |
| 2009/0164202 | A1* | 6/2009 | Lonnemark | G06F 8/52 |
| | | | | 703/22 |
| 2012/0044136 | A1* | 2/2012 | Kim | H04N 21/4263 |
| | | | | 345/156 |
| 2014/0170606 | A1* | 6/2014 | Chong | G09B 19/0053 |
| | | | | 434/118 |
| 2015/0364060 | A1* | 12/2015 | Gupta | A63H 30/04 |
| | | | | 434/118 |
| 2016/0111018 | A1* | 4/2016 | Sousa | G09B 19/0053 |
| | | | | 434/118 |
| 2016/0191604 | A1* | 6/2016 | AbiEzzi | H04L 67/02 |
| | | | | 715/740 |
| 2016/0358505 | A1* | 12/2016 | Isted | G06F 9/445 |
| 2017/0060726 | A1* | 3/2017 | Glistvain | G06F 8/34 |
| 2017/0201518 | A1* | 7/2017 | Holmqvist | H04L 63/0884 |
| 2017/0285628 | A1* | 10/2017 | Erhart | G06Q 10/00 |
| 2018/0060066 | A1* | 3/2018 | Rihani | G06F 8/71 |

FOREIGN PATENT DOCUMENTS

| | | | |
|---|---|---|---|
| KR | 10-2013-0067526 A | 6/2013 | |
| KR | 10-1602557 B1 | 3/2016 | |

OTHER PUBLICATIONS

Chen et al., "Applying virtual reality to remote control of mobile robot", MATEC Conference 2017, Published by EDP Sciences, 2017 (Year: 2017).*

Lavendels et al., "Interactive collaboration in distance learning based on remote control of server session", 14th International Conference on Interactive Collaborative Learning, 2011, IEEE, pp. 183-186, Downloaded on Oct. 19, 2020 at 17:31:10 UTC from IEEE Xplore. (Year: 2011).*

Bochicchio et al., "Hands-On Remote Labs: Collaborative Web Laboratories as a Case Study for IT Engineering Classes", IEEE Transactions on Learning Technologies (vol. 2, Issue: 4, Oct.-Dec. 2009), pp. 320-330 (Year: 2009).*

Korean Office Action for related KR Application No. 10-2018-0044403 dated Apr. 11, 2019 from Korean Intellectual Property Office.

* cited by examiner

Function A
{

Source code block 1 ~410
    Source code block 2 ~420
    Source code block 3 ~430
    Source code block 4 ~440

}

DIRECT AND REMOTE CONTROL APPARATUS OF PHYSICAL DEVICE

CROSS-REFERENCE TO RELATED APPLICATION

This application is based on and claims priority under 35 U.S.C. 119 to Korean Patent Application No. 10-2018-0044403, filed on Apr. 17, 2018, the contents of which are incorporated by reference herein in their entirety.

BACKGROUND

Field of the Invention

The present invention relates to a technology for the direct remote control system of a physical device and, more particularly, to a computer-executable direct remote control apparatus of a physical device, which enables a teacher terminal to directly and remotely control a physical device connected to a student terminal in a physical software training environment.

Discussion of the Related Art

Recently, software coding training is included in the curriculum of an elementary school, and the importance of coding training is highlighted. Software coding training is performed based on a computer, and may be thus grafted onto play and game in order to meet a trainer's eye level unlike the existing training.

Physical computing is one of the core concepts of the computing system area, and is an activity to notify a computer of a value in the real world using a sensor and to produce a program using the value. To deliver a value in the real world to the computer is called a sensor, and to move the value in the real world in response to a command from the computer is called an actuator. In order to use a sensor and an actuator, only a programming language of an expert level could be used. However, a programming language can be used more easily as a sensor capable of being used by anyone is recently developed and supplied.

Korean Patent No. 10-1602557 (Mar. 11, 2016) relates to a method and system for controlling user activity-based media consumption. The user activity-based device consumption control method implemented by a computer includes the steps of storing physical activity information related to a user's motion and controlling whether to control an electronic device or the use time of the electronic device based on the physical activity information.

Korean Patent No. 10-1143137 (May 8, 2012) relates to a wireless device, including a remote station part, such as a cellular phone, a PDA, a laptop computer or a handheld computer, and a detachably connected medical apparatus part, such as a blood sugar monitor. The medical apparatus part is isolated from the remote station part by an isolation circuit and electromagnetic shielding in order to prevent the electronic devices of the remote station part and radio frequency transmission from interfering with a medical device. Furthermore, the control processor of the remote station part includes a battery management unit for disabling functions when the charging of a power source is insufficient to provide sufficient power for an operation of a medical device.

PRIOR ART DOCUMENT

Patent Document

1. Korean Patent No. 10-1602557 (Mar. 11, 2016)
2. Korean Patent No. 10-1143137 (May 8, 2012)

SUMMARY

An embodiment of the present invention proposes a computer-executable direct remote control apparatus of a physical device, which enables a teacher terminal to directly and remotely control a physical device connected to a student terminal in a physical software training environment.

An embodiment of the present invention proposes a computer-executable direct remote control apparatus of a physical device, which can perform efficient training between a teacher terminal and a student terminal and efficient control of a physical device by implementing a virtual remote training environment and a virtual remote control environment.

An embodiment of the present invention proposes a computer-executable direct remote control apparatus of a physical device, which can intercept direct remote control of a teacher terminal over a physical device in a virtual remote control environment and provide the teacher terminal with the right to control the physical device.

In embodiments, a direct remote control apparatus of a physical device includes a virtual machine unit for remote training, configured to implement a virtual remote training environment regarding physical software coding training between a student terminal and a teacher terminal, a virtual machine unit for remote control, configured to implement a virtual remote control environment regarding physical operation control over a physical device connected to the student terminal and to perform direct remote control of the teacher terminal, and a hypervisor unit for physical device control, configured to intercept the direct remote control of the teacher terminal over the physical device in the virtual remote training environment and to provide the teacher terminal with a right to control the physical device.

The virtual machine unit for remote control may be configured to detect the type of physical device and to provide the student terminal with a model source code including at least some exemplary representation code regarding the physical device.

The virtual machine unit for remote control may be configured to recommend the model source code, along with a modified exemplary representation code associated with the exemplary representation code, modified by an existing student, and recognized as being excellent by the teacher terminal, when the model source code is selected by the student terminal.

The virtual machine unit for remote control may be configured to synchronize a real operation state code, stored in the memory of the physical device to represent a corresponding operation, and a virtual operation state code managed in the virtual remote control environment whenever the corresponding operation of the physical device is performed.

The virtual machine unit for remote control may be configured to perform the operation of the physical device by inducing a modification of the real operation state code through a modification of the virtual operation state code.

The hypervisor unit for physical device control may be configured to detect a change in a virtual operation state code stored in a previous direct remote control process when the direct remote control in the virtual remote training environment is intercepted under the approval of the student terminal.

The hypervisor unit for physical device control may be configured to initialize the physical device to a pre-assigned operation by resetting the virtual operation state code when a change in the stored virtual operation state code is detected and to configure the virtual operation state code based on the direct remote control.

The hypervisor unit for physical device control may be configured to recover the right to control the physical device if the direct remote control is not performed by the teacher terminal for a specific time from a point of time at which the right to control the physical device is provided.

BRIEF DESCRIPTION OF THE DRAWINGS

FIG. 4 is a diagram illustrating an example of a model source code on interactive content of FIG. 1.

DESCRIPTION OF REFERENCE NUMERALS

Figure 1:
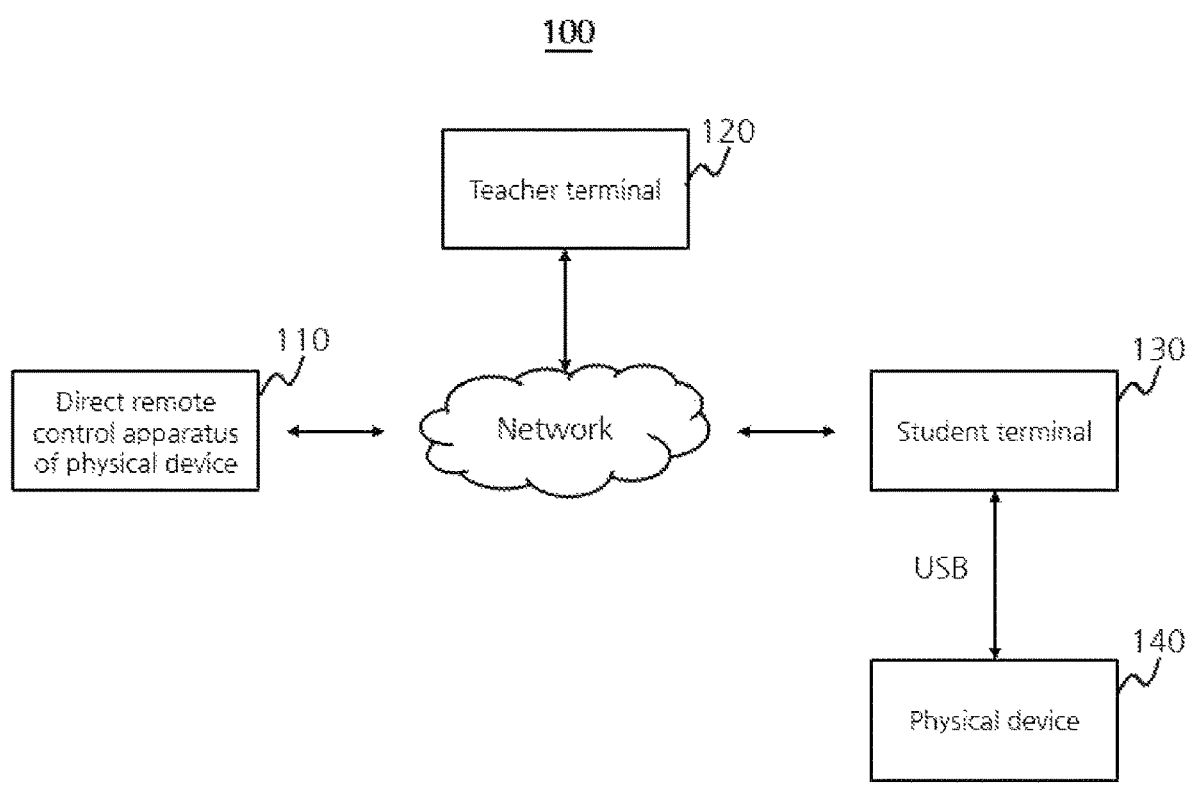
FIG. 1 is a diagram illustrating a system for the direct remote control apparatus of a physical device system according to an embodiment of the present invention.

100: direct remote control system of physical device
110: direct remote control apparatus of physical device
120: teacher terminal 130: student terminal
140: physical device
210: virtual machine unit for remote training
220: virtual machine unit for remote control
230: hypervisor unit for physical device control
240: controller
250: Memory of physical device
260: actual operation state code block
270: virtual remote control environment
280: virtual operation state code block
400: model source code

DETAILED DESCRIPTION

A description of the present invention is merely an embodiment for a structural and/or functional description. The range of right of the present invention should not be construed as being limited to embodiments described in the context. That is, the embodiments may be modified in various forms, and the range of right of the present invention should be construed as including equivalents which may realize the technical spirit. Furthermore, the object or effect proposed in the present invention does not mean that a specific embodiment must include all objects or effects or must include only a corresponding effect, and thus the range of right of the present invention should not be understood to be limited thereto.

The meaning of terms described in this application should be construed as follows.

The terms, such as the "first" and the 'second", are used to distinguish one element from the other element, and the range of right of the present invention should not be restricted by the terms. For example, a first element may be named a second element. Likewise, a second element may be named a first element.

When it is said that one element is described as being "connected" to the other element, the one element may be directly connected to the other element, but it should be understood that a third element may be interposed between the two elements. In contrast, when it is described that one element is described as being "directly connected" to the other element, it should be understood that a third element is not interposed between the two elements. Meanwhile, the same principle applies to other expressions, such as "between ~" and "just between ~" or "adjacent to ~" and "adjacent just to ~", which describe a relation between elements.

An expression of the singular number should be understood to include plural expressions, unless clearly expressed otherwise in the context. The terms, such as "include" or "have", should be understood to indicate the existence of a set characteristic, number, step, operation, element, part, or a combination of them and not to exclude the existence of one or more other characteristics, numbers, steps, operations, elements, parts, or a combination of them or a possibility of the addition of them.

In each of steps, symbols (e.g., a, b, and c) are used for convenience of a description, and the symbols do not describe order of the steps. The steps may be performed in order different from order described in the context unless specific order is clearly described in the context. That is, the steps may be performed according to described order, may be performed substantially at the same time, or may be performed in reverse order.

The present invention may be implemented in a computer-readable recording medium in the form of computer-readable code. The computer-readable recording medium includes all types of recording devices in which data readable by a computer system is stored. The computer-readable recording medium may include ROM, RAM, CD-ROM, magnetic tapes, floppy disks, and optical data storages, for example. Furthermore, the computer-readable recording medium may be distributed to computer systems connected over a network, and the computer-readable code may be stored and executed in the computer systems in a distributed manner.

All the terms used herein, including technological or scientific terms, have the same meanings as those that are typically understood by those skilled in the art, unless otherwise defined. Terms, such as ones defined in common dictionaries, should be construed as having the same meanings as those in the context of related technology and should not be construed as having ideal or excessively formal meanings, unless clearly defined in the specification.

FIG. 1 is a diagram illustrating a system for the direct remote control apparatus of a physical device system according to an embodiment of the present invention.

Referring to FIG. 1, the direct remote control system 100 of a physical device includes a direct remote control apparatus 110 of a physical device, a teacher terminal 120, a student terminal 130 and a physical device 140, which may be connected over a network.

The direct remote control apparatus 110 of a physical device may correspond to an apparatus connected to the teacher terminal 120 and the student terminal 130 and capable of controlling the physical device 140 directly and remotely. The direct remote control apparatus 110 of the physical device 140 is described more specifically with reference to FIG. 2A.

The teacher terminal 120 may be managed by a teacher, and may correspond to a computing device capable of training a student through an interaction with the student terminal 130. For example, the teacher terminal 120 may be implemented by a desktop or a notebook. The teacher terminal 120 may be assigned based on the type of physical device 140, and may control the physical device 140 directly and remotely.

The student terminal 130 may be managed by a student, and may correspond to a computing device capable of being trained by a teacher through direct remote control with the teacher terminal 120. For example, the student terminal 130 may be implemented by a desktop or a notebook. For another example, the student terminal 130 may be implemented by a smartphone or a tablet personal computer (PC).

The physical device 140 may be connected to the student terminal 130 through a USB, and may perform a specific operation through direct remote control of the student terminal 130 or indirect remote control using a program. For example, the physical device 140 may include a robot, an RC vehicle, etc., and may operate through direct or indirect remote control by the student terminal 130. The physical device 140 may operate through direct remote control by the teacher terminal 120 under the approval of the student terminal 130.

Figure 2A:
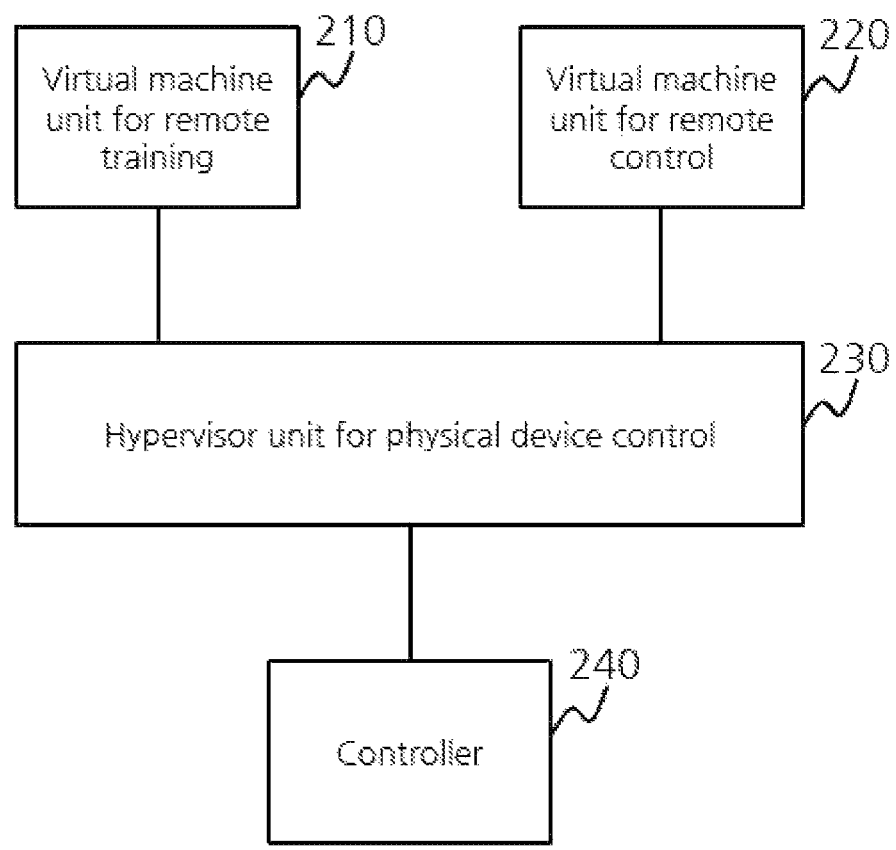
FIG. 2A is a block diagram illustrating the direct remote control apparatus of a physical device shown in FIG. 1.

FIG. 2A is a block diagram illustrating the direct remote control apparatus of a physical device shown in FIG. 1.

Referring to FIG. 2A, the direct remote control apparatus 110 of a physical device includes a virtual machine unit for remote training 210, a virtual machine unit for remote control 220, a hypervisor unit for physical device control 230 and a controller 240.

The virtual machine unit for remote training 210 includes a virtual machine that has implemented a virtual remote training environment regarding physical software coding training between the student terminal 130 and the teacher terminal 120. The virtual remote training environment corresponds to a physical software coding training method which may be performed by overcoming a temporal and/or spatial limit between a teacher and a student. For example, various training engineering media, such as a desktop and a notebook may be used as a medium. For another example, a telephone or video may be used.

In one embodiment, the virtual machine unit for remote training 210 may support a virtual remote training environment. The teacher terminal 120 and the student terminal 130 may perform training through the virtual remote training environment by overcoming a temporal and/or spatial limit. The teacher terminal 120 may provide efficient training by preparing a training program in advance. The student terminal 130 may perform self-motivated learning in a self-initiated manner.

In one embodiment, the virtual machine unit for remote training 210 first detects the type of physical device 140 connected to the student terminal 130. For example, the type of physical device 140 may include a robot, an RC vehicle, etc. The virtual machine unit for remote training 210 may provide interactive content corresponding to source code training content capable of controlling an operation of the physical device 140 connected to the student terminal 130. The interactive content may include source code training content capable of completing an exemplary representation of the model source code 400 through an interoperation (e.g., at least one of a student's code input behavior, a teacher's code input and verbal explanation behaviors) between the student terminal 130 and the teacher terminal 120.

In one embodiment, when a model source code 400 is selected by the student terminal 130, the virtual machine unit for remote training 210 may recommend the selected model source code along with a modified exemplary representation code. The modified exemplary representation code may include a code that has been associated with the exemplary representation code, modified by the existing student, and recognized as being excellent by the teacher terminal 120. In this case, the model source code 400 corresponds to a program code capable of controlling an operation of the physical device 140. The exemplarily represented model source code 400 is described with reference to FIG. 4.

FIG. 4 is a diagram illustrating an example of a model source code on interactive content of FIG. 1.

The model source code 400 sequentially includes first to fourth source code blocks 410~440. The first and second source code blocks 410 and 420 are model codes marked in black, and correspond to code blocks that do not need to be amended by the student terminal 130. The third and fourth source code blocks 430 and 440 are codes that are marked (i.e., dimmed) in gray and exemplarily represented, and correspond to code blocks that require a user code input without any change or a user code input through a modification process by the student terminal 130. In one embodiment, source code blocks may be dimmed like the third and fourth source code blocks 430 and 440.

In one embodiment, the first and second source code blocks 410 and 420 may return to the original state after a lapse of a specific time although the reception of a user code input is rejected or a user code input is received.

In one embodiment, the third and fourth source code blocks 430 and 440 allows the reception of a user code input, and may overlay a user code input on a code, marked in gray, in a different color (e.g., blue) when the user code input is identical with the corresponding code. In another embodiment, the third and fourth source code blocks 430 and 440 may store a modified example by associating the modified example with the model source code 400 when a user code input received from the student terminal 130 is received differently from a code marked in gray. The reason for this is that a code modification of another student terminal 130 is checked and a recommendation is provided.

Referring back to FIG. 2A, the virtual machine unit for remote training 210 may suggest and recommend the model source code 400 capable of controlling an operation of the physical device 140 connected to the student terminal 130 by providing a virtual remote training environment, and enables remote training to be smoothly performed between the student terminal 130 and the teacher terminal 120.

In one embodiment, the virtual machine unit for remote control 220 includes a virtual machine in which a virtual remote control environment 270 enabling the teacher terminal 120 to control the physical device 140, connected to the student terminal 130, directly and remotely has been implemented. The virtual machine unit for remote control 220 may store a virtual operation state code 280 managed in the virtual remote control environment 270, and may control an operation of the physical device 140 by synchronizing the virtual operation state code 280 and a real operation state code 260 stored in the memory 250 of the physical device 140.

In one embodiment, the virtual machine unit for remote control 220 may enable the teacher terminal 120 to modify the real operation state code 260 stored in the memory 250 of the physical device 140 by modifying the virtual operation state code 280. For example, when the teacher terminal 120 modifies the virtual operation state code 280 into a binary code capable of performing an operation of lifting the right foot of a robot 45 degrees, the robot performs the corresponding operation.

In one embodiment, the virtual machine unit for remote control 220 may modify the real operation state code 260, stored in the memory 250 of the physical device 140, through a modification of the virtual operation state code 280 in the teacher terminal 120.

The hypervisor unit for physical device control 230 may provide the teacher terminal 120 with the right to control the physical device 140, connected to the student terminal 130, directly and remotely under the approval of the student terminal 130. A direct remote control process between the teacher terminal 120 and the physical device 140 is described with reference to FIG. 2B.

Figure 2B:
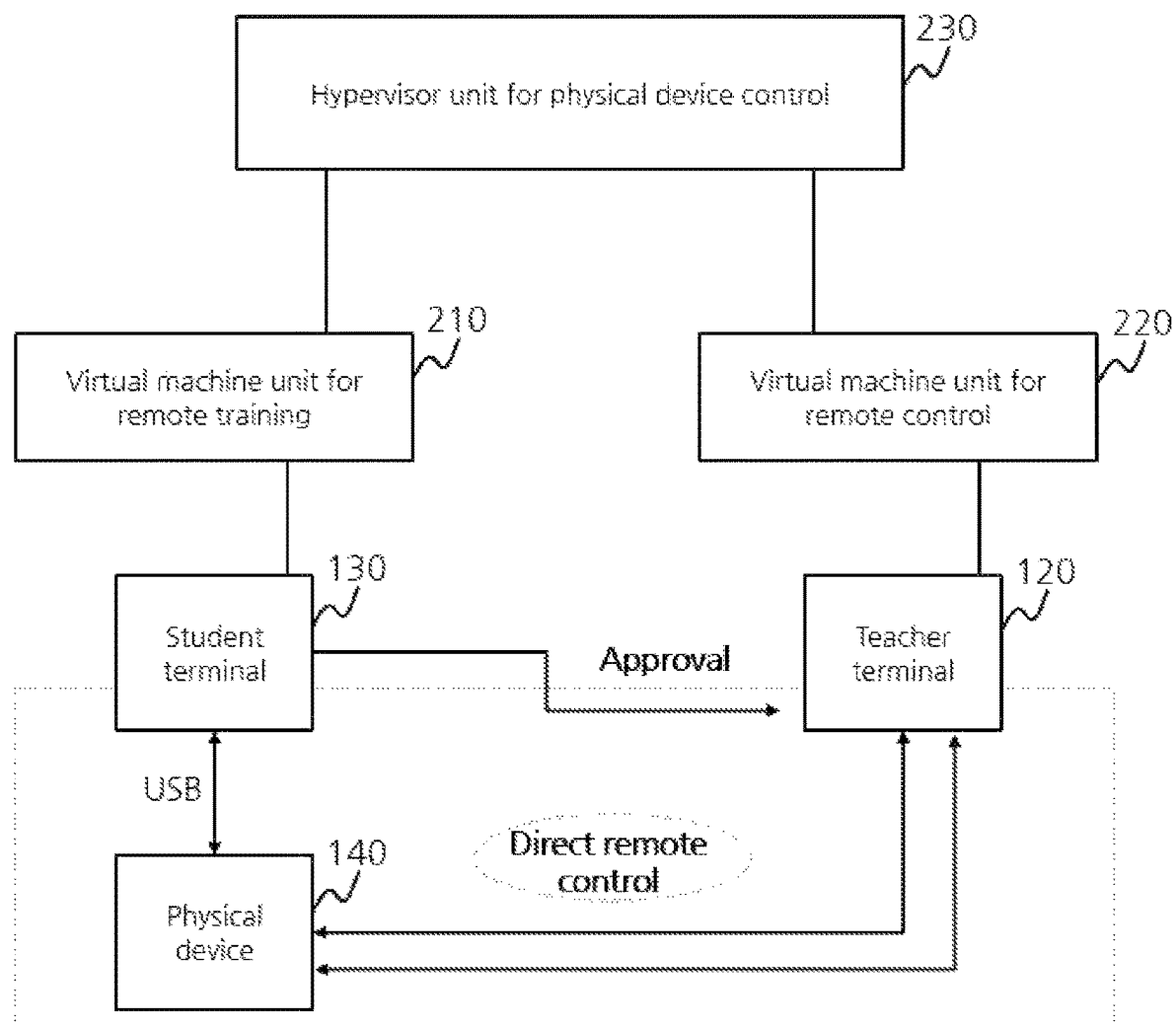
FIG. 2B is a diagram illustrating a direct remote control process between a teacher terminal and a physical device, which is performed in a hypervisor unit for physical device control shown in FIG. 2A.

FIG. 2B is a diagram illustrating a direct remote control process between the teacher terminal and the physical device, which is performed in the hypervisor unit for physical device control shown in FIG. 2A.

Referring to FIG. 2B, the hypervisor unit for physical device control 230 may perform the resetting of the real operation state code 260, stored in the memory 250 of the physical device 140, in the teacher terminal 120. For example, a robot may perform a specific operation by the execution of the model source code 400 or in response to a command from the student terminal 130 or a command from the teacher terminal 120. After a lapse of a given time from the execution of the specific operation, the teacher terminal 120 may reset the real operation state code 260, stored in the memory of the robot, in order to perform a new operation. When the teacher terminal 120 configures a virtual operation state code 280 for performing a new operation after resetting the real operation state code, the robot may perform the new operation.

In one embodiment, the hypervisor unit for physical device control 230 may recover the right of the teacher terminal 120 to control the physical device 140, connected to the student terminal 130, directly and remotely. For example, although the control right to directly control a robot has been provided to the teacher terminal 120, if the teacher terminal 120 responds to the provision for a specific time, a direct remote control process may be terminated.

Figure 2C:
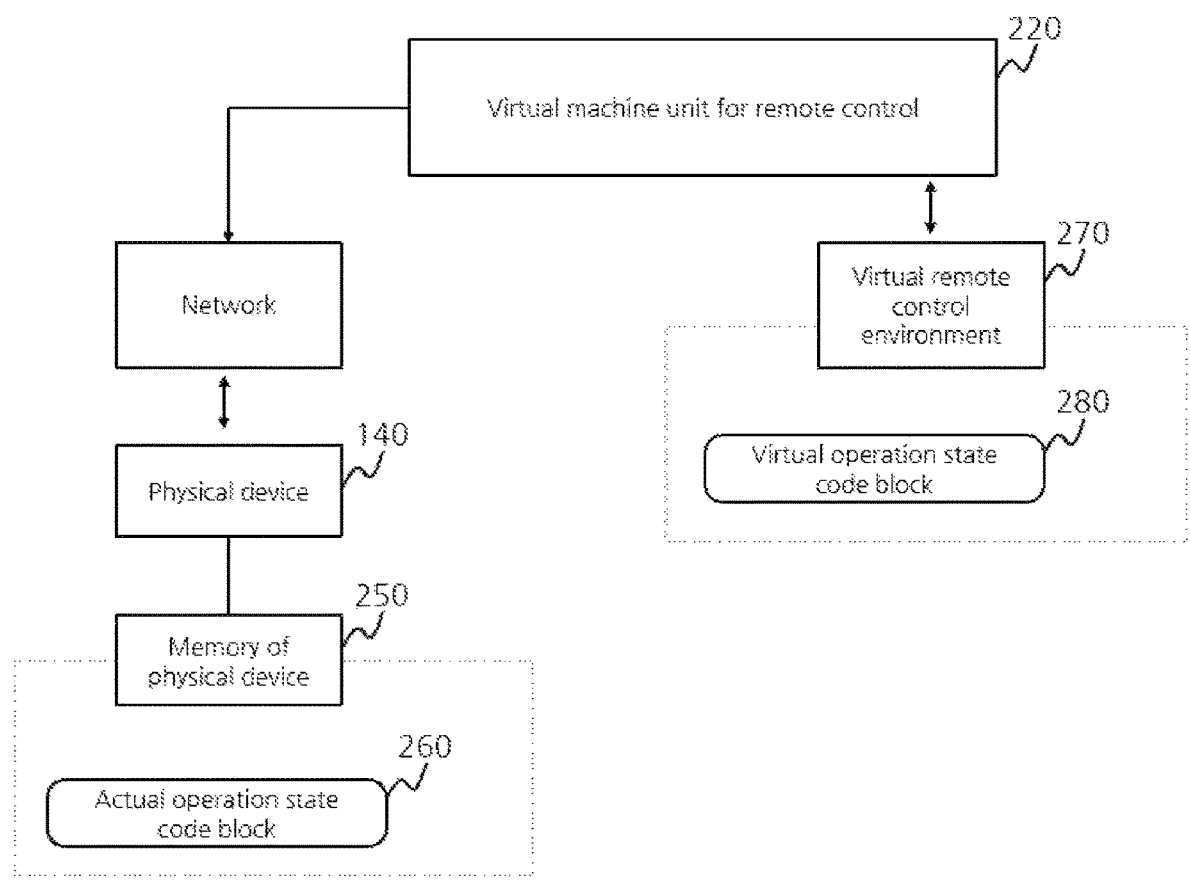
FIG. 2C is a diagram showing the synchronization of a virtual machine unit for remote control, shown in FIG. 2A, from a real operation state code to a virtual operation state code.

FIG. 2C is a diagram showing the synchronization of the virtual machine unit for remote control, shown in FIG. 2A, from a real operation state code to a virtual operation state code.

Referring to FIG. 2C, the real operation state code 260 corresponds to a binary code that is stored in the memory 250 of the physical device 140 and that represents an operation of the physical device 140. It is hereinafter assumed that the physical device 140 corresponds to a robot. For example, when the robot performs an operation of lifting the right hand 45 degrees by the execution of the model source code 400 or in response to a command from the student terminal 130 or a command from the teacher terminal 120, the robot modifies the real operation state code 260 into a binary code (e.g., 00001101) that represents the corresponding operation, and performs the corresponding operation. For another example, the robot may perform an operation of lifting the left hand up to the sky through a user's physical action. After the corresponding operation is completed, the robot modifies the real operation state code 260 into a binary code (e.g., 11101100) that represents the corresponding operation. That is, the real operation state code 260 represents the current operation of the robot as a binary code. Inversely, when the corresponding binary code is modified, the robot may perform an operation according to the corresponding binary code.

The virtual operation state code 280 is a binary code managed in the virtual remote control environment 270, and may be used to represent an operation of the physical device 140.

Figure 3:
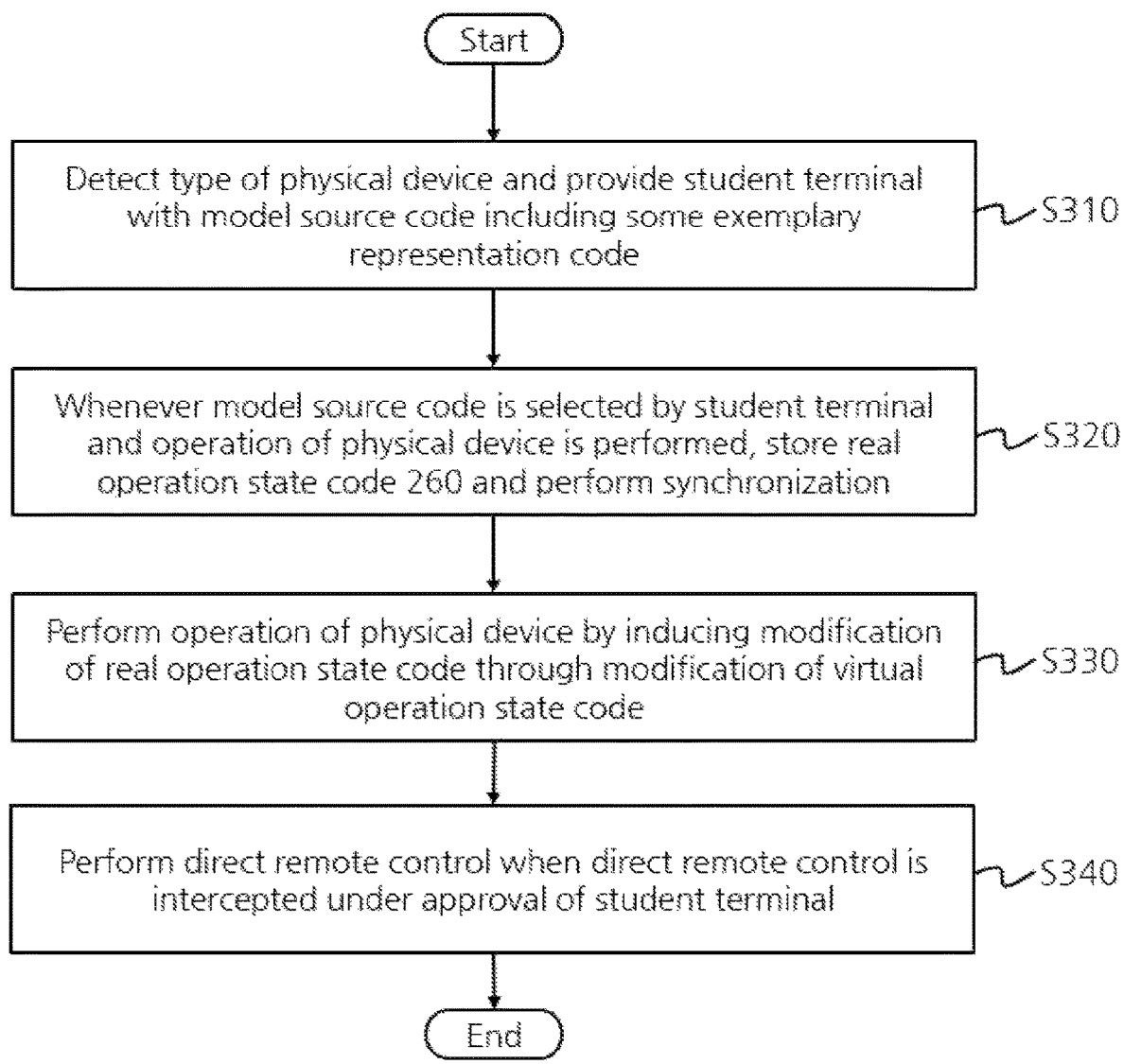
FIG. 3 is a flowchart illustrating a direct remote control process between a teacher terminal and a physical device connected to a student terminal in FIG. 1.

FIG. 3 is a flowchart illustrating a direct remote control process between the teacher terminal and the physical device connected to the student terminal in FIG. 1.

Referring to FIG. 3, the direct remote control apparatus 110 of a physical device enables the virtual machine unit for remote training 210 to detect the type of physical device 140, and may provide the student terminal 130 with the model source code 400 including some exemplary representation code capable of controlling an operation of the physical device 140 (step S310). Whenever the model source code 400 is selected by the student terminal 130 and an operation of the physical device 140 is performed, the virtual machine unit for remote training 210 may store the real operation state code 260, representing the corresponding operation, in the memory 450 of the physical device and may perform synchronization (step S320). The virtual machine unit for remote control 210 may modify the real operation state code 260, stored in the memory 410 of the physical device connected to the student terminal 130, through a modification of the virtual operation state code 280 managed in the virtual remote control environment 270 (step S330). If there is an approval from the student terminal 130, the hypervisor unit for physical device control 230 may enable the teacher terminal 120 to control the physical device 140, connected to the student terminal 130 directly and remotely through a virtual remote training environment (step S340).

The disclosed technology may have the following effects. However, this does not mean that a specific embodiment must include all the following effects or must include only the following effects. Accordingly, the range of right of the disclosed technology should not be understood as being limited thereto.

An embodiment of the present invention can provide the computer-executable direct remote control apparatus of a physical device, which can perform efficient training between a teacher terminal and a student terminal and efficient control over a physical device by implementing a virtual remote training environment and a virtual remote control environment.

An embodiment of the present invention can provide the computer-executable direct remote control apparatus of a physical device, which can intercept direct remote control of a teacher terminal over a physical device in a virtual remote control environment and provide the teacher terminal with the right to control the physical device.

Although some embodiments of the present invention have been described above, those skilled in the art will appreciate that the present invention may be modified and changed in various ways without departing from the technical spirit and scope of the present invention written in the appended claims.

What is claimed is:

1. A direct remote control apparatus of a physical device, comprising:

a virtual machine unit for remote training, configured to implement a virtual remote training environment regarding coding training between a student terminal and a teacher terminal;

a virtual machine unit for remote control, configured to implement a virtual remote control environment regarding physical operation control over a physical device connected to the student terminal and to perform control by the teacher terminal; and a hypervisor unit for physical device control, configured to intercept the control by the teacher terminal over the physical device in the virtual remote training environment and to provide the teacher terminal with a right to control the physical device, wherein the virtual machine unit for remote control is further configured to modify a real operation state code, stored in memory of the physical device to represent a corresponding operation of the physical device, by modifying a virtual operation state code managed in a virtual remote control environment into a binary code that represents the corresponding operation of the physical device, wherein the hypervisor unit for physical device control is further configured to:
- detect a change in the virtual operation state code when the control in the virtual remote training environment is intercepted under an approval of the student terminal;
- initialize the physical device to a pre-assigned operation by resetting the virtual operation state code when a change in the virtual operation state code is detected;
- configure the virtual operation state code based on the control; and
- enable the teacher terminal to control the physical device through the virtual remote training environment based on an approval from the student terminal, wherein the virtual machine unit for remote training is further configured to:
- detect a type of the physical device; and
- provide the student terminal with a model source code comprising at least some exemplary representation code regarding the physical device, wherein the model source code includes at least one source code block that does not need to be amended by the student terminal and at least one source code block that requires a user code input, the at least one source code block that does not need to be amended including model codes being displayed in a first color and the at least one source code blocks that requires a user code input including model codes being displayed in a second color different than the first color, wherein the at least one source code block that requires a user code input allows reception of the user code input and overlays the user code input in a third color on the model codes displayed in the second color, based on the user code input being identical with the model codes displayed in the second color, the third color being different than the first color and the second color, and wherein the virtual machine unit for remote training, the virtual machine unit for remote control, and the hypervisor unit are each implemented via at least one processor.

2. The direct remote control apparatus of claim 1, wherein the virtual machine unit for remote training is further configured to recommend the model source code, along with a modified exemplary representation code associated with the exemplary representation code, modified by an existing student, and recognized by the teacher terminal, when the model source code is selected by the student terminal.

3. The direct remote control apparatus of claim 1, wherein the virtual machine unit for remote control is further configured to perform the corresponding operation of the physical device by inducing a modification of the real operation state code through a modification of the virtual operation state code.

4. The direct remote control apparatus of claim 1, wherein the hypervisor unit for physical device control is further configured to recover the right to control the physical device if the control is not performed by the teacher terminal for a specific time from a point of time at which the right to control the physical device is provided.

5. The direct remote control apparatus of claim 1, wherein the virtual machine unit for remote training is further configured to store the real operation state code in the memory of the physical device and perform a synchronization of the real operation state code and the virtual operation state code based on the model source code being selected by the student terminal and an operation of the physical device being performed.

* * * * *